Dec. 7, 1943.  L. S. WILLIAMS  2,336,329
WEIGHING SCALE
Filed June 29, 1942   5 Sheets-Sheet 2
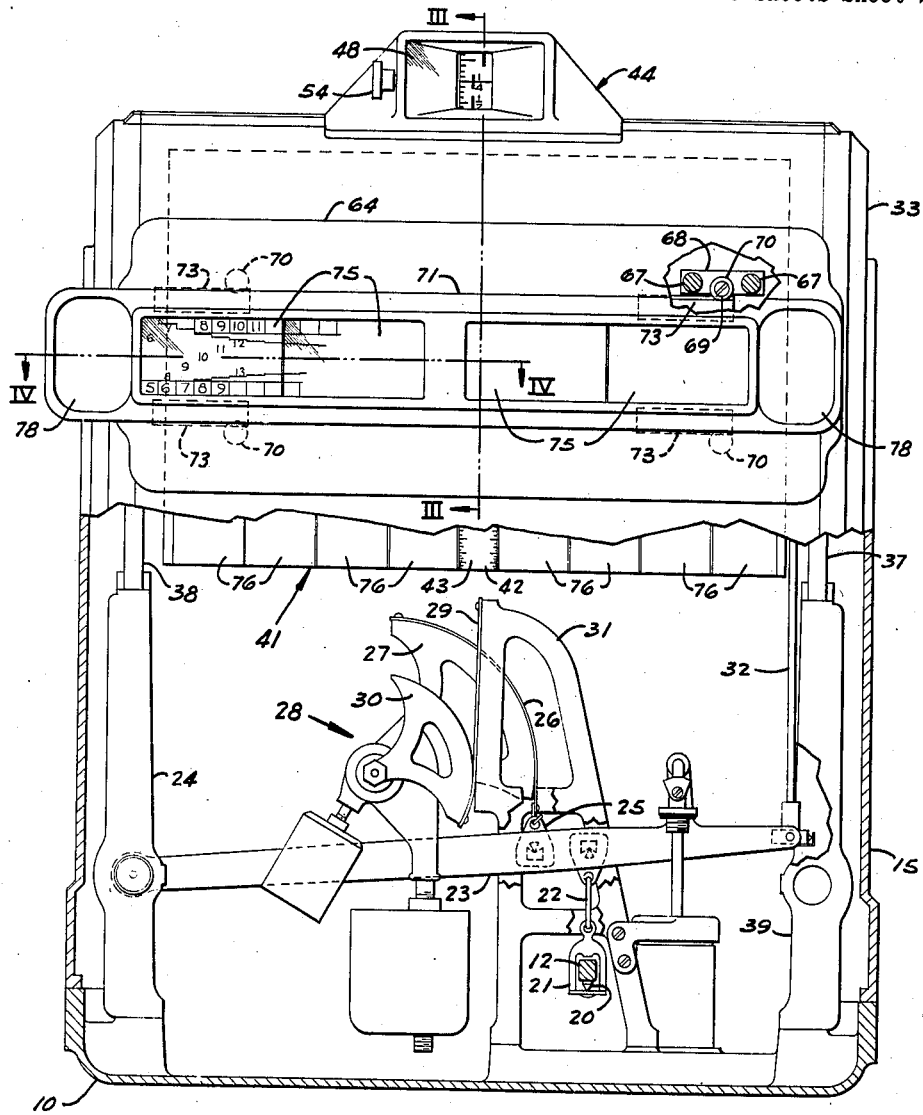
Fig. II
Lawrence S. Williams
INVENTOR
BY Marshall and Marshall
ATTORNEYS

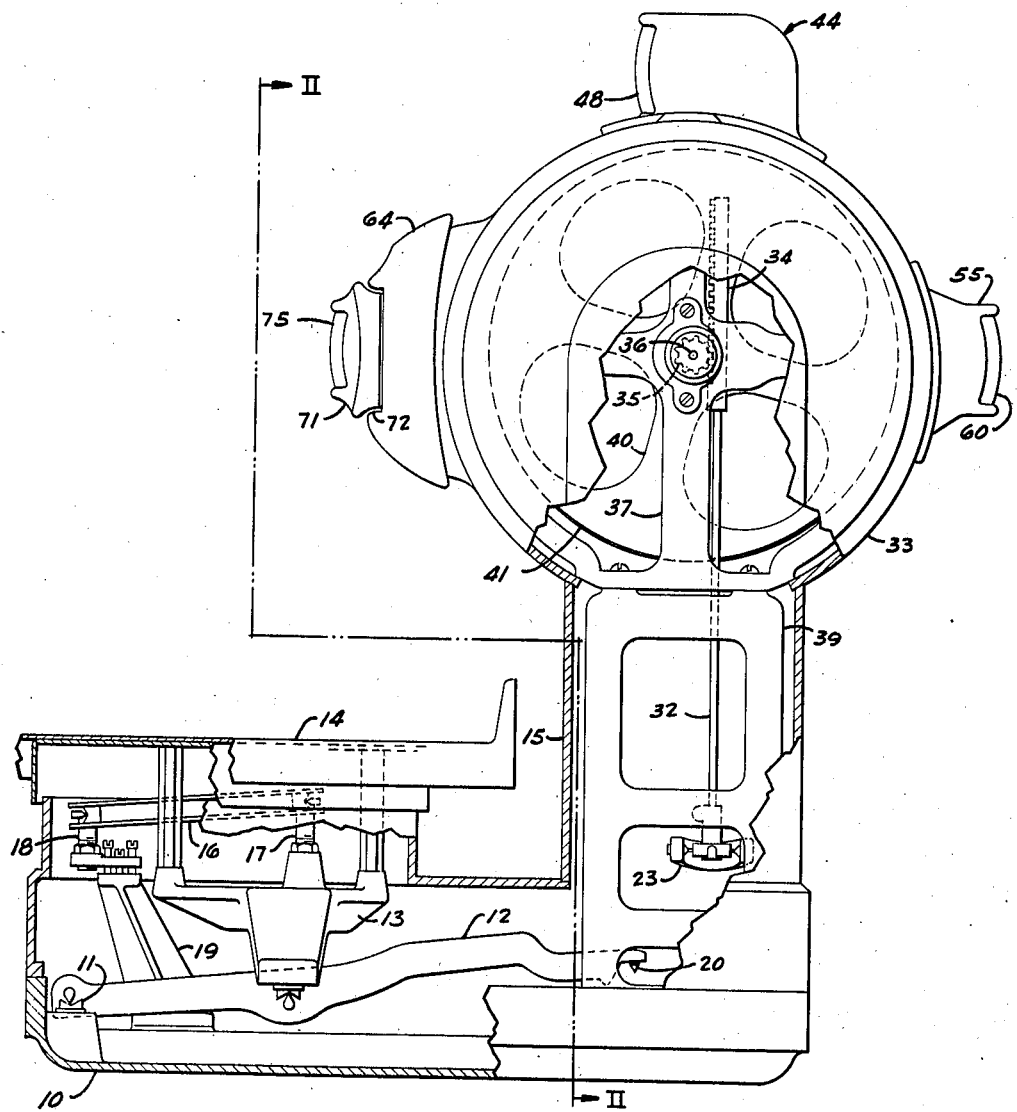

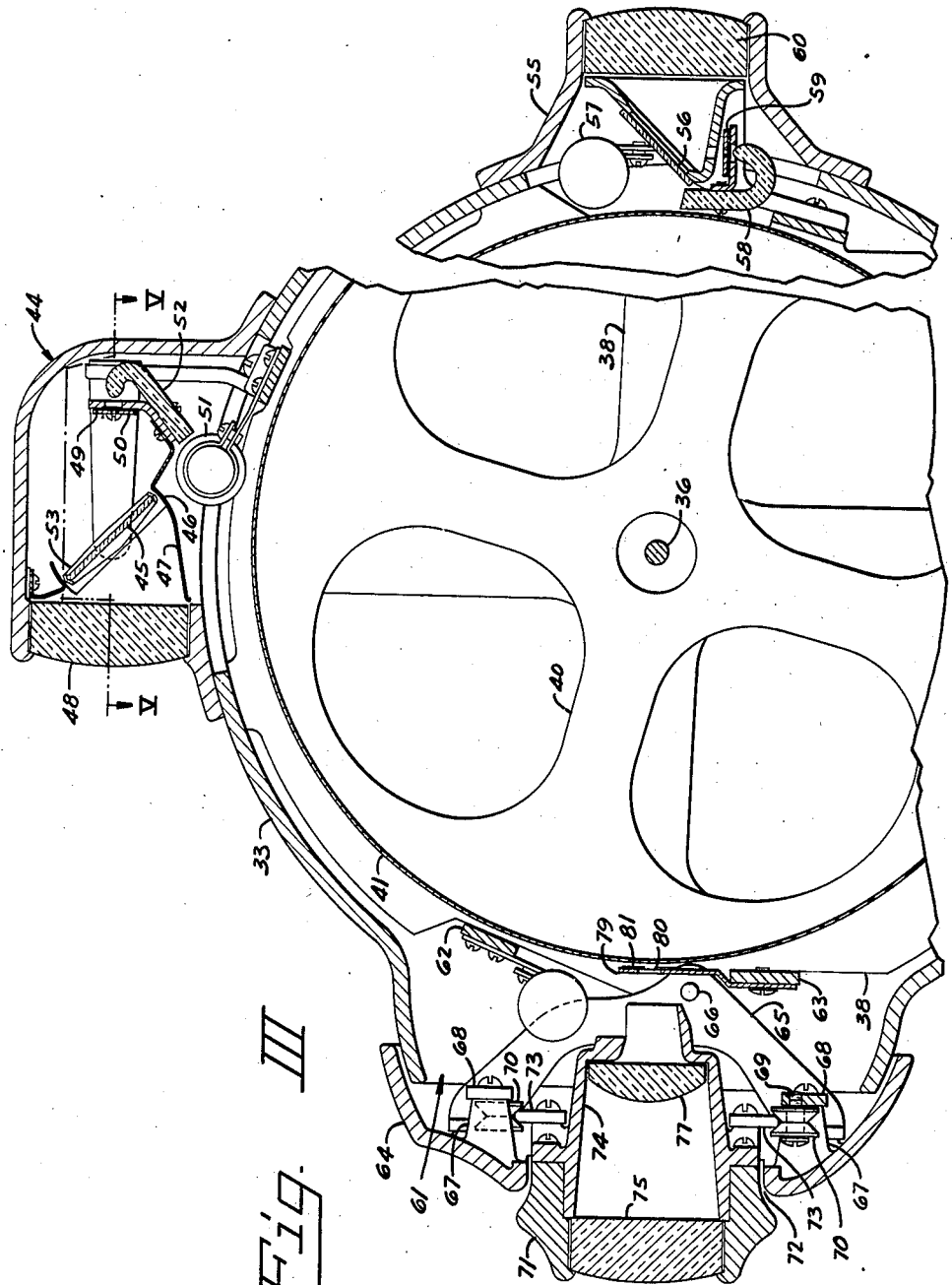

Dec. 7, 1943.   L. S. WILLIAMS   2,336,329
WEIGHING SCALE
Filed June 29, 1942   5 Sheets-Sheet 4
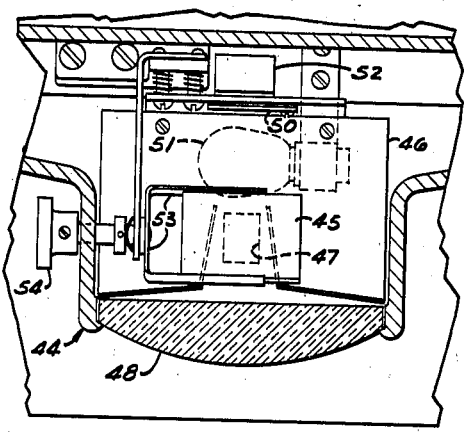
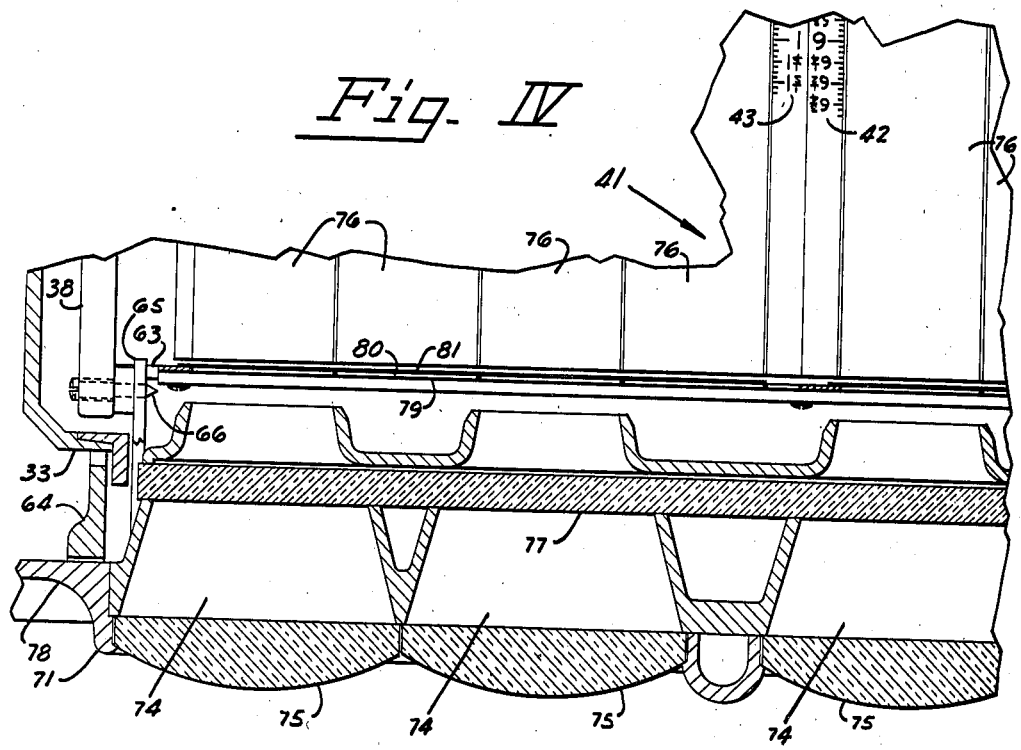
Lawrence S. Williams
INVENTOR
BY Marshall and Marshall
ATTORNEYS Dec. 7, 1943.    L. S. WILLIAMS    2,336,329
WEIGHING SCALE
Filed June 29, 1942     5 Sheets-Sheet 5
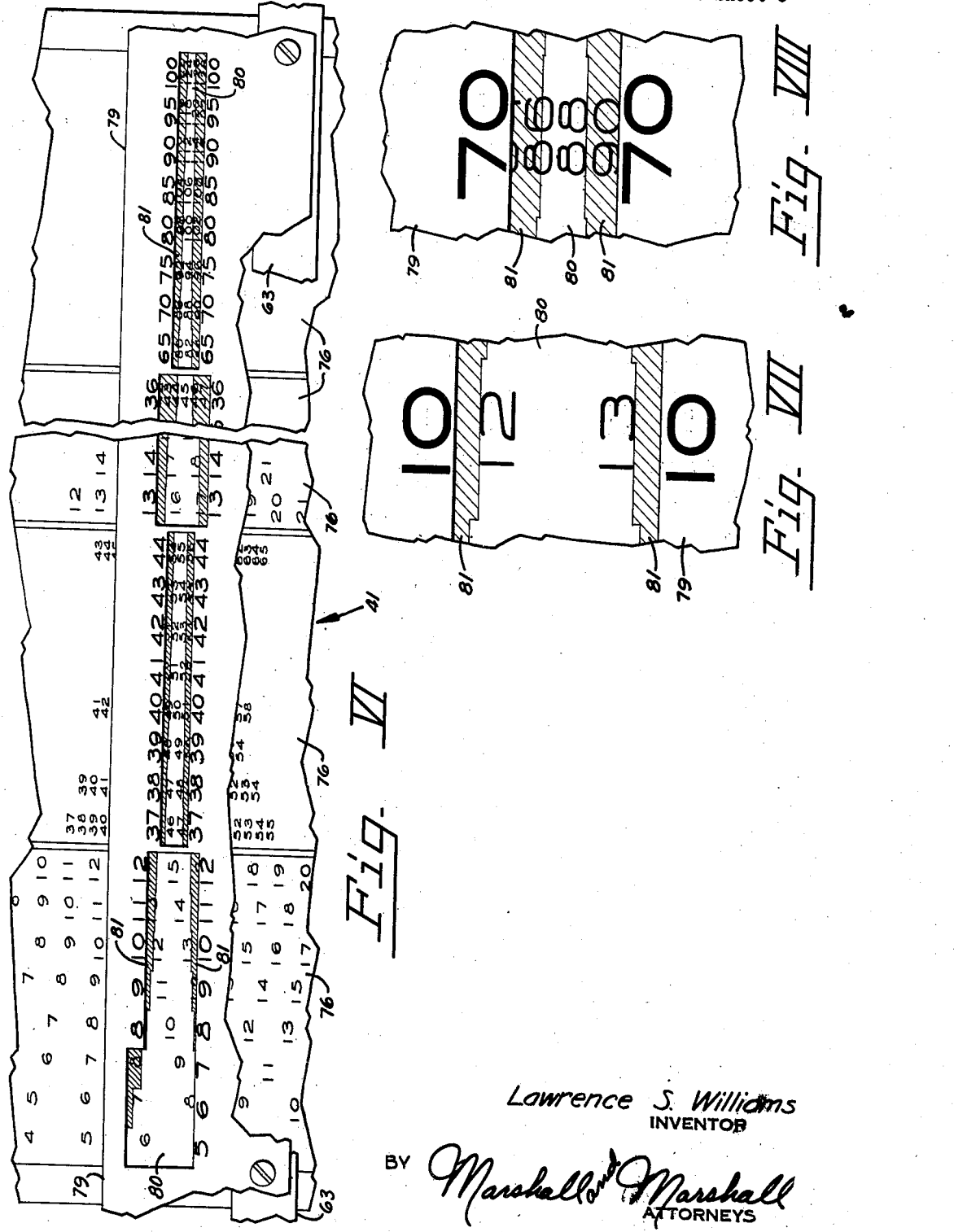
Lawrence S. Williams
INVENTOR
BY Marshall & Marshall
ATTORNEYS Patented Dec. 7, 1943

2,336,329

UNITED STATES PATENT OFFICE 2,336,329

WEIGHING SCALE

Lawrence S. Williams, Toledo, Ohio, assignor to Toledo Scale Company, Toledo, Ohio, a corporation of New Jersey Application June 29, 1942, Serial No. 448,903

4 Claims. (Cl. 116—129)

This invention relates to weighing scales of the computing type in which computed amounts are indicated by a plurality of figures inscribed in peripheral rows on the chart of the weighing scale, each of which figures corresponds to the product of that price per pound corresponding to the peripheral row in which such figure appears and the weight represented by that weight indicium in line with which the computed amount figure is inscribed. Such charts are usually in one of two general forms; they may be charts for fan scales or for cylinder scales. This invention relates primarily to charts for cylinder scales. The subject matter of the instant application is disclosed, but not claimed, in a co-pending application of Marshall and Williams, Serial No. 425,810, filed January 7, 1942.

In cylinder scale charts it is common to have a peripheral row of computed amount indicia for each of the various prices per pound at which merchandise may be sold. Such computed amount indicia rows usually consist of graduations and figures corresponding thereto. In order to read these rows of computed amount indicia, there is provided a reading line which is stationary and extends transversely across the chart. The computed amount is shown by that one of the graduations which registers with the reading line when the merchandise is weighed. Since this reading line must be slightly removed from the periphery of the chart, so there will be no possibility of contact between the line and the chart, parallax is a frequent source of error. A person of short stature looking into the viewing device from below its level has a line of vision substantially different from that of a tall person and such difference may amount to as much as a cent or two depending upon the price per pound which is being read.

When it is desirable to have a large number of graduations on the chart, it is necessary to provide magnifying means for properly viewing the graduations. In order to prevent the reading line from obscuring the graduations and figures on the chart, this line must be of very small diameter. Since it must be free of the chart, and have open space around it, it is usually in the form of a wire stretched across in front of the chart. It is extremely difficult to construct wires of small enough diameter so that they can be used without obscuring figures and graduations upon the chart.

Since the space on the surface of the chart is limited by practical reasons of size and weight, the necessity of having a large number of graduations on the chart results in a smaller amount of space in which to print the figures representing computed amounts.

It is an object of this invention to provide a weighing scale in which the computing chart may be highly magnified to permit a large number of computed amount figures to be shown without the danger of errors occurring due to parallax.

It is another object of this invention to provide a weighing scale having a chart which can be correctly read without the use of a sighting line.

It is a further object of this invention to provide a cylinder chart for a weighing scale in which the individual graduations are eliminated.

More specific objects and advantages are apparent from the description, in which reference is had to the accompanying drawings illustrating a preferred form of scale embodying the invention.

In the drawings:

Fig. I is an end elevational view of a weighing scale embodying the invention, certain parts being shown in section and certain parts being broken away.

Fig. II is a view, taken substantially from the position indicated by the line II—II of Fig. I.

Fig. III is a fragmentary view, taken substantially on the line III—III of Fig. II.

Fig. IV is a fragmentary horizontal sectional view, taken substantially on the line IV—IV of Fig. II.

Fig. V is a fragmentary sectional view, taken substantially on the line V—V of Fig. III.

Fig. VI is a fragmentary view in elevation of portions of the chart and price-indicia-bearing member of the weighing scale shown in Fig. I.

Figs. VII and VIII are enlarged fragmentary views of portions of the mechanism shown in Fig. VI.

These specific drawings and the specific description that follows merely disclose and illustrate the invention and are not intended to impose limitations upon the claims.

Mounted on a base 10, by means of bearings 11, is a main lever 12 which pivotally carries a platter spider 13. On the upper end of the spider 13 there is mounted a commodity platter 14. The commodity platter 14 overlies a main housing 15 which is mounted on the base 10 and encloses the lever 12. A check link 16 is pivotally connected between a stud 17, extending upwardly from the spider 13, and a stud 18, adjustably secured to the upper end of a bracket 19 bolted to the base 10. The check link 16 insures the horizontal position and vertical movement of the commodity platter 14.

A cone-pointed pivot 20, located in the nose end of the lever 12, is engaged in a stirrup 21 (Fig. II) which is connected, by means of a link 22, to the power pivot of a pendulum lever 23 fulcrumed in an upright frame member 24. The pendulum lever 23 is pivotally connected to a link 25 attached to the lower end of a metallic ribbon 26 which overlies and is clamped to the arcuate face of a power section 27 forming a portion of a load counterbalancing pendulum 28. The pendulum 28 is supported by two metallic ribbons 29, secured to the faces of power sectors 30, and a sector guide bracket 31 which is mounted on the base 10.

The nose end of the pendulum lever 23 is pivotally connected to the lower end of a pull rod 32 which extends upwardly through the housing 15 and into the interior of a cylindrically-shaped dial housing 33 mounted atop the housing 15. A rack 34 is secured to the upper end of the pull rod 32 and is in mesh with a pinion 35 secured to one end of a horizontal chart shaft 36 journaled in bearings and a pair of chart brackets 37 and 38 mounted on the upper end of a vertical frame member 39 and the vertical frame member 24 respectively.

Also mounted on the shaft 36 are several chart spiders 40 (see also Fig. III) on the peripheries of which a cylindrical chart 41 is mounted. The chart 41 (Fig. IV) has two rows of weight indicia 42 and 43 which extend around its periphery substantially at its center. The row of weight indicia 43 serves as the merchant's weight indication and is visible through a weight-viewing periscope 44 (Figs. I, II and III) located at the top center of the cylindrical chart housing 33. The periscope 44 contains a transparent mirror 45 and a screen 46 which has an aperture 47 through which the weight indicia on the periphery of the chart 41 are visible. These indicia are reflected by the mirror 45 forwardly and are magnified by a lens 48 located on the merchant's side of the periscope 44.

An indicating line for the merchant's weight indicia is afforded by a colored translucent sheet 49 illuminated through a slotted screen 50 located behind the mirror 45, by means of light from a lamp 51 projected through the colored sheet 49 by a light carrier 52 made of "Lucite" or similar material. The lamp 51 also illuminates the surface of the chart 41 above which it is located. This mechanism gives a nonparallax indication of weight to the merchant since the indicia reflected by the mirror 45 are seen in the same plane as the colored indicating line which is visible through the mirror 45.

The mirror 45 is mounted in a bracket 53 (see also Fig. V) which is rotatable about an axis parallel to the axis of the chart 41 by means of a knurled knob 54 located on the exterior of the periscope 44, to vary the angle of the line of vision for persons of different stature.

A customer's weight indication is similarly afforded by means of somewhat similar equipment located in the interior of a bezel 56 (Figs. I and III) located on the customer's side of the scale. In this case, however, a transparent mirror 56 reflects a colored indicating line created by light from a lamp 57 carried by a hook-shaped light carrier 58 and projected through a colored translucent sheet 59 onto the mirror 56. The row of weight indicia 42 is read through the mirror 56 and magnified along with the colored indicating line by a lens 60 mounted in the bezel 55.

On the merchant's side of the scale the dial housing 33 has a flared rectangular horizontally extending opening 61 (Fig. III), the horizontal center line of which is on the same plane as the axis of the chart 41. Located just within this opening are two horizontal cross bars 62 and 63 which extend between the chart brackets 37 and 38.

A rockable scroll 64 is mounted by means of a pair of angle brackets 65 (Figs. III and IV) which are pivoted on two cone-pointed screws 66 extending horizontally through the end of the chart brackets 37 and 38. The scroll is rockable about an axis formed by the two screws 66. On the interior of the scroll 64, on the inner ends of four pairs of bosses 67 (Figs. II and III), there are bolted four short bars 68 into each one of which there is threaded a stud 69 which serves as an axle for a roller 70.

A horizontally shiftable lens frame 71 extends into an opening 72 through the front of the scroll 64 and is mounted for horizontal shifting by means of four rails 73 which are bolted to the lens frame 71 and which slide on the rollers 70. The lens frame 71 carries four lens cells 74, each of which is shaped like a truncated four-sided pyramid, both ends of the cells being open. The outer ends of each of the lens cells 74 are approximately twice as wide and twice as high as the inner ends of the lens cells and are centered therewith substantially on the same horizontal plane as the center of the openings 61 and 72 and the axis of the chart 41. At the front of each of the lens cells 74 there is located a lens 75. There are two of the lens cells 74 and lenses 75 on each side of the center of the lens frame 71 and there are four amount areas 76 on the periphery of the chart 41 on each side of the two center weight indicia rows 42 and 43. Each of the amount areas 76 is made up of several adjacent peripheral rows of amount indicia for consecutive prices per pound. A single cylindrical lens 77 extends horizontally through all of the lens cells 74 near their innermost ends. A fingerhold 78 is constructed on each end of the lens frame 71 for manually shifting the lens frame 71 from side to side. The scroll 64 may be rocked vertically to tilt the focal planes of the lenses 75 and 77 to accommodate persons of different height. In Fig. IV the lens frame 71 is shown in its left position and the lens cells 74 are over the first, third, fifth and seventh ones of the amounts areas 76. When the lens cell 71 is shifted to the right, the lens cells are in viewing relation with the second, fourth, sixth and eighth ones of the amount areas 76. The lenses 75 and 77 are of such power that the amount areas visible in each position appear to fill the entire width of the openings in the lens frame.

A price-indicia-bearing member 79 is secured to the cross bar 63 and extends horizontally across behind the openings in the lens cells 74. In Fig. VI it can be seen that this price-indicia-bearing member 79 has price indicia areas corresponding to the amount areas on the periphery of the chart 41. For example, the first amount area and price area on the chart 41 and member 79 on the left side of these members corresponds to prices from 5 to 12¢ per pound inclusive and computed amounts for these prices at various numbers of pounds. The second of these price and mount indicia areas carries indicia for prices per pound from 37 to 44¢ inclusive. The third of such areas carries indicia for prices of from 13¢ upwardly, and the fourth area prices from 45¢ upwardly. The eighth of such areas (the one illustrated at the right of Fig. VI) carries price and amount indicia for prices of from 65¢ to $1.00 per pound. Thus the prices represented by the first, third, fifth and seventh price and amount areas cover all prices per pound from 5¢ to 36¢ per pound inclusive, and the price and amount indicia in the second, fourth, sixth and eighth of such areas cover prices per pound from 37¢ to $1.00 inclusive.

The price-indicia-bearing member 79, in addition to carrying indicia showing the price per pound at which the various rows of computed amounts are calculated, has horizontally extending openings 80 with transparent colored strips 81 along the upper and lower margins of the openings. The height of the area 80 at each of the individual rows of amount indicia is determined by the sum of the height of a single amount figure on the chart in such row of indicia plus the distance on the chart in such row of amount indicia corresponding to an amount of one cent. As can be seen in Fig. VI, and in particular in Figs. VII and VIII, the amount is always shown by that one of the amount indicia visible in the clear open center opening 80 in the price-indicia-bearing member 79. In these figures the chart 41 is shown in the position it would assume under a load of 1¼ pounds. When two figures are shown in this center opening (as is shown in Fig. VII), the correct value is midway between the two figures so exhibited. If the two figures exhibited in the area between the transparent colored margins of the opening 80 do not extend equidistantly into the clear center opening, the amount is represented by that one of the two figures which extends furthest into the opening as, for example, the amount shown in the 41¢ per pound price range in Fig. VI. Fig. VIII represents the indication shown by a price of 70¢ per pound for 1¼ pounds, which is 87½¢ and which is closer to 88¢ than to 86¢. If the two figures "86" and "88" extended equidistantly into the clear center area the price would be 87¢ but, as shown, the price is 88¢. This is illustrated in the $1.00 per pound price range in Fig. VI where "1.24" and "1.26" are shown equidistantly extending into the clear center area for a correct computed amount of $1.25. The fact that the portions of the figures which do not extend into the center area are visible through the colored transparent margins prevents misreading.

The embodiment of the invention which has been disclosed may be modified to meet various requirements.

Having described the invention, I claim:

1. In a computing weighing scale, in combination, a cylindrical chart responsive to loads weighed on said scale and bearing peripheral rows of computed amount indicia, and a price-indicia-bearing member associated with said chart, said price-indicia-bearing member extending along said chart parallel to the axis of said chart and adjacent to such rows of computed amount indicia, each price indicium being in line with that row of amount indicia corresponding to the computed amounts of weight times that price corresponding to such price indicium, said price-indicia-bearing member having a longitudinally extending transparent area, with colored transparent material forming the margins of said transparent area, the central part of said transparent area being distinct from said margins the width of and the central part of said transparent area at each row of amount indicia being such that it spans a peripheral distance in the row of amount indicia associated therewith representing one cent plus the height of any numeral in such row of amount indicia.

2. In a computing weighing scale, in combination, a cylindrical chart responsive to loads weighed on said scale, said chart having a plurality of peripheral rows of computed amount indicia, each of said rows corresponding to a selected price per pound, and a price-indicia-bearing member extending parallel to the axis of said chart, each price indicium borne by said member corresponding to one of said rows of amount indicia, said member having a central longitudinally extending transparent area of varying width through which said amount indicia are visible, the width of said area adjacent each row of amount indicia being such that it spans a peripheral distance in that row of amount indicia associated therewith representing to a value of one cent plus the height of a figure in such row of indicia.

3. In a computing weighing scale, in combination, a cylinder chart responsive to loads weighed on said scale, said chart having peripheral rows of computed amount numerals, each of said rows of numerals comprising products of a selected price per pound and weight, and a price-indicia-bearing member extending parallel to the axis of said chart, said member bearing a price indicium associated with each of said rows of numerals, said member having a longitudinally extending center zone through which said numerals are visible, said zone being of varying width, the width of said zone adjacent each row of amount indicia being such that it spans the peripheral distance in that row of computed amount indicia associated therewith corresponding to the height of one of the numerals therein plus a peripheral space representing a minimum desirably indicatable computed value.

4. The combination of a cylindrical weighing scale chart having a plurality of peripheral rows of computed amount indicia, each of said rows of indicia comprising amount numerals corresponding to products of weight and a selected price per pound and a price-indicia-bearing member having a price indicium for each of said rows of computed amount indicia and a longitudinally extending transparent section adjacent said price indicia through which said rows of computed amount indicia are visible, the width of said transparent area adjacent each row of amount indicia being substantially equal to the sum of the height of an individual numeral in that one of said rows of computed amount indicia plus the distance in said row of computed amount indicia representing a value of one cent.

LAWRENCE S. WILLIAMS.